Feb. 3, 1959 E. A. CALAMAI 2,871,776
TELEVISION CAMERA IRIS CONTROL MECHANISM
Filed July 30, 1953 2 Sheets-Sheet 1

INVENTOR.
EDWARD A. CALAMAI
BY
ATTORNEY

Feb. 3, 1959　　　　　　　E. A. CALAMAI　　　　　2,871,776
TELEVISION CAMERA IRIS CONTROL MECHANISM
Filed July 30, 1953　　　　　　　　　　　　　2 Sheets-Sheet 2

INVENTOR.
EDWARD A. CALAMAI
BY
ATTORNEY

United States Patent Office 2,871,776
Patented Feb. 3, 1959

2,871,776

TELEVISION CAMERA IRIS CONTROL MECHANISM

Edward A. Calamai, Hawthorne, N. Y., assignor to General Precision Laboratory Incorporated, a corporation of New York Application July 30, 1953, Serial No. 371,328

4 Claims. (Cl. 95—64)

This invention relates in general to a multiple lens television camera, and more particularly to an iris control mechanism for such a camera.

In the usual television pickup camera, several lenses are rotatably mounted on a turret so that the operator can readily select a lens having the proper focal length for the particular scene being televised. Controls for lens selection, focusing, and iris diaphragm opening are usually located at the rear of the camera or, in some cases, at a remote point. The iris adjusting mechanism usually includes a gear sector on each lens which engages a gear on an operating shaft only when that lens is brought into its operative position. This arrangement allows the same controller at the rear of the camera to be used to adjust the iris of any lens which happens to be in the operative position. The difficulty with this arrangement is that the adjustment of the iris is disturbed each time the lens is brought into or out of its operative position. This requires the operator to re-adjust the iris each time a different lens is selected.

An object of this invention is to provide an iris adjusting mechanism which allows a single controller to adjust the iris of any lens in the operative position and which prevents movement of the adjustment while lenses are being changed.

In accordance with a preferred embodiment of the invention, the iris adjusting gear sector is driven by a driving gear which is freely rotatable on its shaft. The shaft rotates an apertured disc which in turn rotates the driving gear by means of a pin secured to the driving gear and projecting through the enlarged aperture in the disc. A pair of weak springs connect the pin with the disc to center the pin in the aperture when the driving gear is not engaging an iris gear sector, as during lens changes. A friction button is fastened to the iris gear sector and bears upon the turret so as to restrain its rotation. When the lens turret is rotated to bring a lens into operative position, the engagement of the iris gear sector and the driving gear will cause relative rotation between the two. The lost motion arrangement allows the driving gear, rather than the iris gear sector, to rotate slightly. As a result, the iris setting remains undisturbed when lenses are changed.

For a more complete understanding of the invention, reference may be made to the accompanying drawing, in which.

Figure 1:
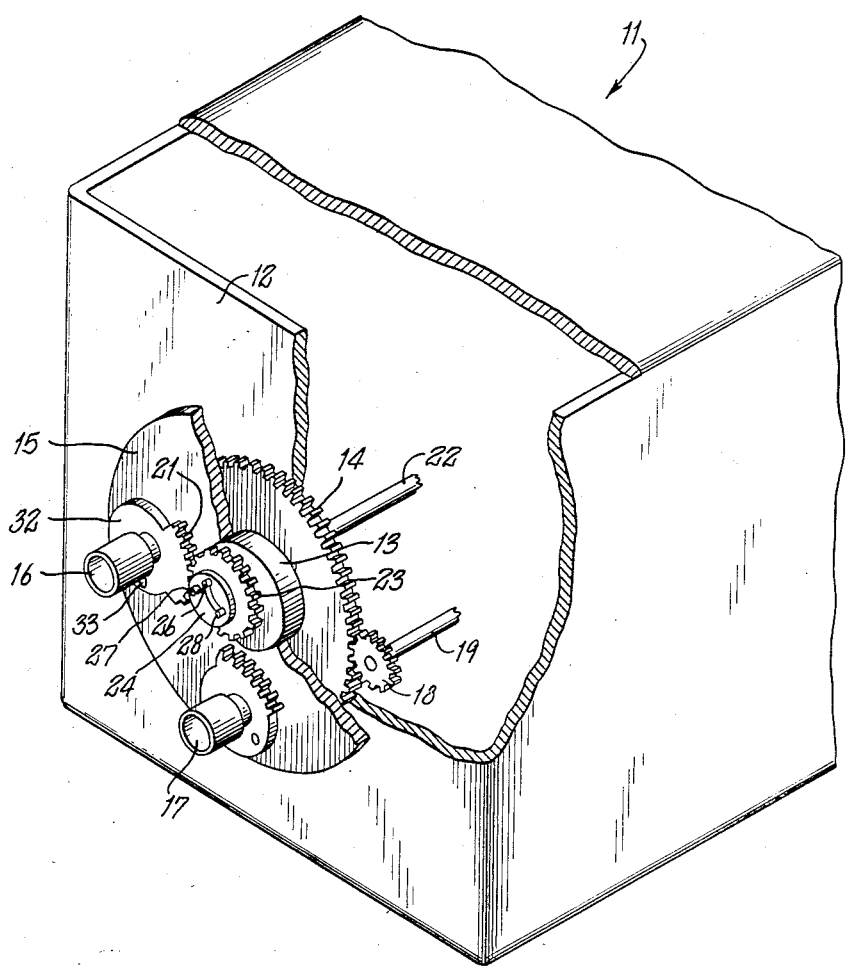
Figure 1 is an isometric view of a lens turret and iris adjusting mechanism in accordance with the invention.

Referring first to Fig. 1, there is shown a boxlike frame structure indicated generally by the reference character 11 which serves to support and house the entire television camera mechanism. Except as hereinafter distinguished, the camera may be similar to the one described in United States Patent No. 2,572,729 to Jackson et al. Mounted on the front plate 12 of the frame structure 11 is a boss 13. A gear wheel 14 and lens turret 15 are fastened together and are mounted to be freely rotatable on the boss 13. A plurality of lenses are mounted on the turret 15, two of which, 16 and 17, are shown in Fig. 1. A pinion 18, mounted on a shaft 19, engages the gear wheel 14 so that rotation of the shaft 19 will rotate the turret 15 to bring one or another of the lenses into operative position. As viewed in Fig. 1, the operative position is at the extreme left in the position occupied by the lens 16.

Figure 2:
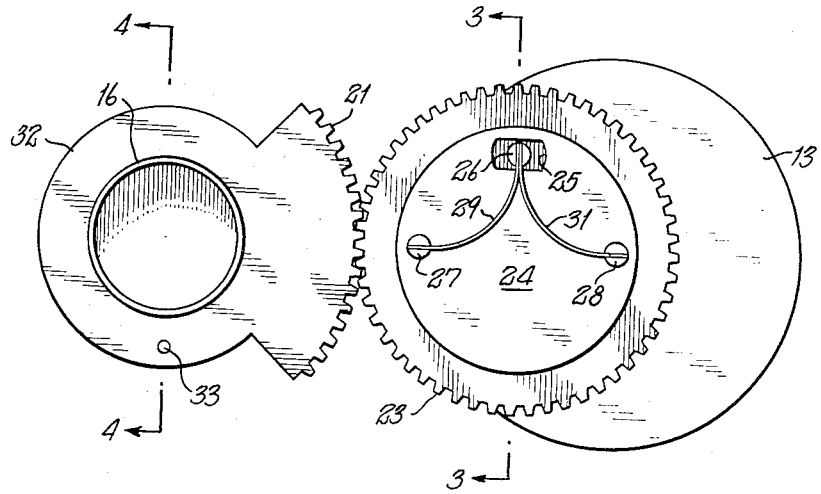
Figure 2 is an elevation view of the iris adjusting mechanism.
Figure 3:
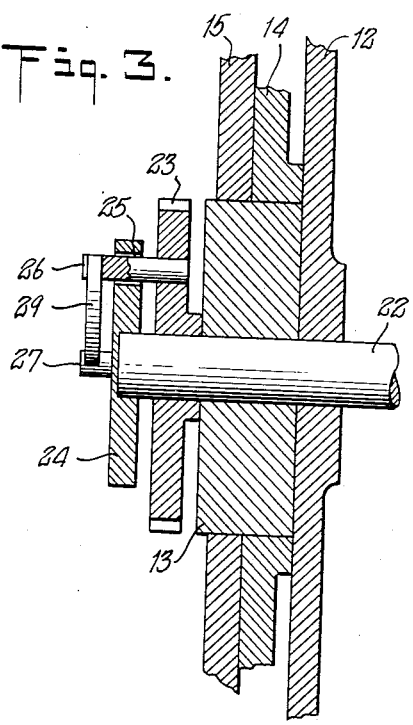
Figure 3 is a cross sectional view taken along the line 4—4 of Fig. 2.

The iris diaphragm opening of the lens 16 may be adjusted by rotation of the gear sector 21. A shaft 22 extends through the front plate 12 and the boss 13 at a point, as viewed in Fig. 1, to the left of the center of the boss 13. As best shown in Figs. 2 and 3, a driving gear 23 is journaled so as to be freely rotatable on the shaft 22 and engages the gear sector 21 of the lens 16. Secured to the shaft 22 is a disc 24 provided with an aperture 25 near its periphery. A pin 26 is secured to the driving gear 23 so as to project through the aperture 25. The aperture 25 is made larger than the pin 26 so that the disc 24 and the gear 23 may rotate slightly relative to each other. Two pins 27 and 28 are mounted on the disc 24 at diametrically opposite points near the periphery and approximately ninety degrees from the aperture 25. A weak, flat spring 29 joins pins 26 and 27, while a similar spring 31 joins pins 26 and 28. These springs serve to center the pin 26 in the aperture 25 during lens changes when the gear 23 is not engaged with an iris adjusting gear sector, such as the sector 21.

Figure 4:
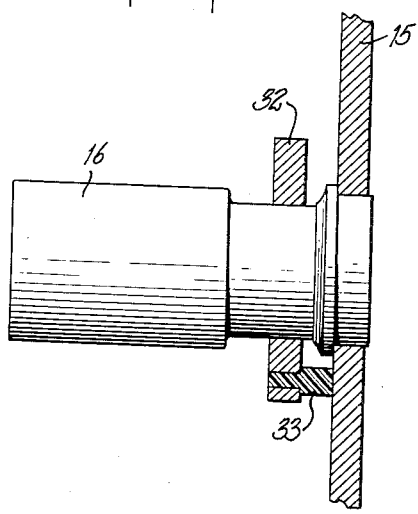
Figure 4 is a cross sectional view taken along the line 4—4 of Fig. 2.

As shown in Figs. 2 and 4, the collar portion 32 of the gear sector 21 is provided with an aperture into which is fitted a button 33 which bears against the lens turret 15 so that the gear sector 21 will not rotate as readily as will the gear 23. Nylon has been found to be a suitable material from which to form the button 33. Similar buttons are provided for each lens.

The apparatus so far described forms a portion of a television pickup camera, the remainder of which may be of any desired construction. The turret rotating shaft 19 and the iris adjusting shaft 22 may be operated by the same or separate controllers from the rear of the camera. Indicators may be provided to show the lens being used and its iris setting. Focusing may be accomplished by adjusting the distance of the pickup tube from the lens. These and other constructional features may, for example, be similar to those shown in the previously mentioned U. S. Patent No. 2,572,729.

In operation, the shaft 22 may be rotated to adjust the iris of lens 16 as desired. When shaft 19 is rotated to select another lens, it can be seen from Fig. 2 that as the lens 16 is rotated out of position, relative motion between the gear sector 21 and the gear 23 must occur. The button 33 provides friction to restrain the motion of the gear sector 21, while the gear 23 is restrained only by the weak springs 29 and 31. Therefore, gear 23 will rotate slightly, leaving the iris setting undisturbed. When the gear sector 21 has moved sufficiently to disengage gear 23, the springs 29 and 31 will re-center the pin 26 in the aperture 25. When another lens is brought to its operative position, the gear 23 will be rotated slightly, allowing the lens to reach the operative position with iris setting unchanged.

The invention has been described in connection with a preferred embodiment. However, many modifications can be made within the scope of the invention. For example, if the iris adjustment of the lens has sufficient inherent friction, it may be possible to omit the frictional element 33. Modifications can be made in the lost motion mechanism between the shaft 22 and the driving gear 23. For example, the pin 26 could be secured to the disc 24 and project into an aperture in gear 23. Many other modifications will occur to those skilled in the art.

What is claimed is:

1. Apparatus for preventing movement of the iris adjustment of a lens of a multiple lens television camera during lens changes comprising, a lens turret rotatable about an axis, a plurality of lenses mounted on said turret, an iris adjusting gear sector on each lens, a shaft the axis of which is eccentric with respect to said turret axis, a driving gear freely rotatable on said shaft and engaging said gear sector when its associated lens is in operating position, a disc secured to said shaft, an aperture in said disc near its periphery, a pin smaller than said aperture secured to said driving gear and projecting through said aperture to allow limited relative rotary movement between said disc and said driving gear, and spring means secured to said pin and to said disc for centering said pin in said aperture whereby when a lens is moved into or out of operating position said driving gear and said gear sector may engage or disengage without rotating said gear sector.

2. Apparatus according to claim 1 further comprising a frictional element secured to said gear sector and bearing on said turret for restraining rotation of said gear sector.

3. Apparatus according to claim 1 in which said spring means comprises a pair of leaf springs, one end of each being secured to said pin and the other ends being secured to diametrically opposite points on the flat surface of said disc.

4. Apparatus according to claim 3 further comprising a frictional element secured to said gear sector and bearing on said turret, for restraining rotation of said gear sector.

References Cited in the file of this patent

UNITED STATES PATENTS

| 2,397,546 | Harris | Apr. 2, 1946 |
| 2,572,729 | Jackson et al. | Oct. 23, 1951 |
| 2,632,370 | Shepard | Mar. 24, 1953 |
| 2,697,971 | Evans | Dec. 28, 1954 |
| 2,782,253 | Allanson | Feb. 19, 1957 |

FOREIGN PATENTS

| 531,524 | France | Jan. 16, 1922 |